United States Patent
Dickinson et al.

[11] Patent Number: 6,142,192
[45] Date of Patent: Nov. 7, 2000

[54] TIRE INFLATION BAG

[76] Inventors: Michael Cecil Dickinson, Squirrels Oak, Squirrels Jump, Alderley Edge Cheshire SK9 7DR; Adrian Oldham, 6 Dandy Row, Darwen, Blackburn, Lancs BB1 3BL, both of United Kingdom

[21] Appl. No.: 09/194,184
[22] PCT Filed: May 11, 1998
[86] PCT No.: PCT/GB98/01335
  § 371 Date: Dec. 8, 1998
  § 102(e) Date: Dec. 8, 1998
[87] PCT Pub. No.: WO98/51519
  PCT Pub. Date: Nov. 19, 1998

[30] Foreign Application Priority Data

May 14, 1997 [GB] United Kingdom .................... 9709735

[51] Int. Cl.$^7$ ...................................................... B65B 1/04
[52] U.S. Cl. .................. 141/97; 141/4; 141/38; 141/114; 141/313; 206/304.1; 296/37.3; 150/154
[58] Field of Search ................................ 141/38, 97, 114, 141/313, 4; 152/187, 213 A, DIG. 14; 206/304.1; 296/37.3; 150/154

[56] References Cited

U.S. PATENT DOCUMENTS

| | | | |
|---|---|---|---|
| 1,888,777 | 11/1932 | Stein | 206/304.1 |
| 1,910,416 | 5/1933 | Wollheim | 206/304.1 |
| 3,648,613 | 3/1972 | Cunn . | |
| 4,036,274 | 7/1977 | Peel, Sr. . | |
| 4,126,169 | 11/1978 | Magnuson et al. . | |
| 4,352,382 | 10/1982 | Weidler . | |
| 4,410,021 | 10/1983 | Blevins et al. . | |
| 5,439,727 | 8/1995 | Riggs et al. . | |

FOREIGN PATENT DOCUMENTS

WO 95/19906  7/1995  WIPO .

*Primary Examiner*—Henry J. Recla
*Assistant Examiner*—Timothy L. Maust
*Attorney, Agent, or Firm*—Oliff & Berridge, PLC

[57] ABSTRACT

A method of inflating a tire and a bag fitted over a tire during inflation. The bag is constructed so as to substantially envelope an exposed outer surface of a tire during inflation, whereby in the event of the tire exploding the bag contains the debris of the explosion, and allows the compressed air from the tire to escape.

26 Claims, 3 Drawing Sheets

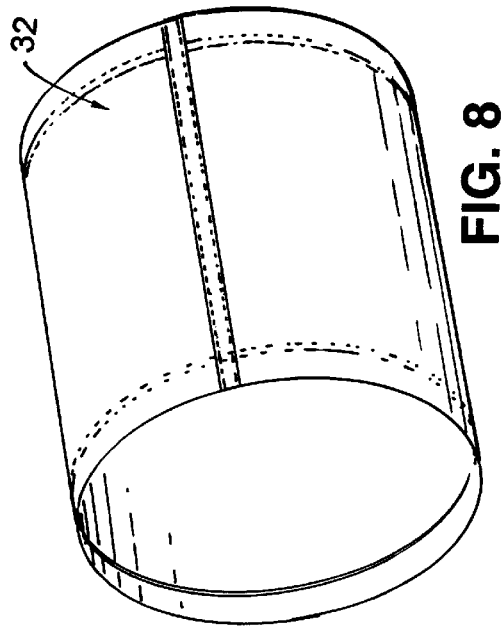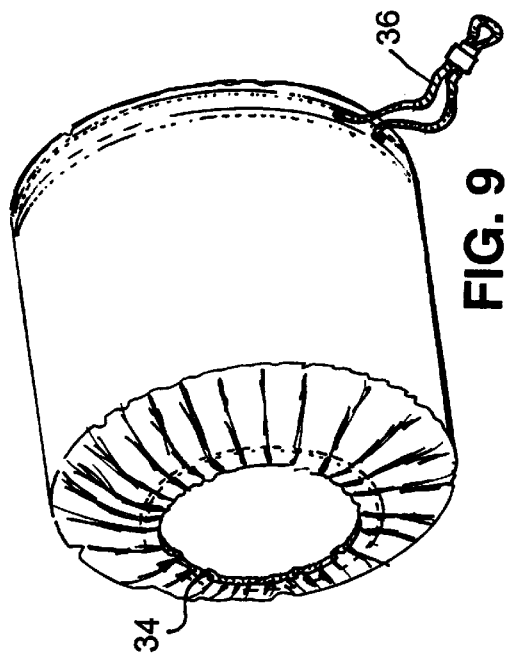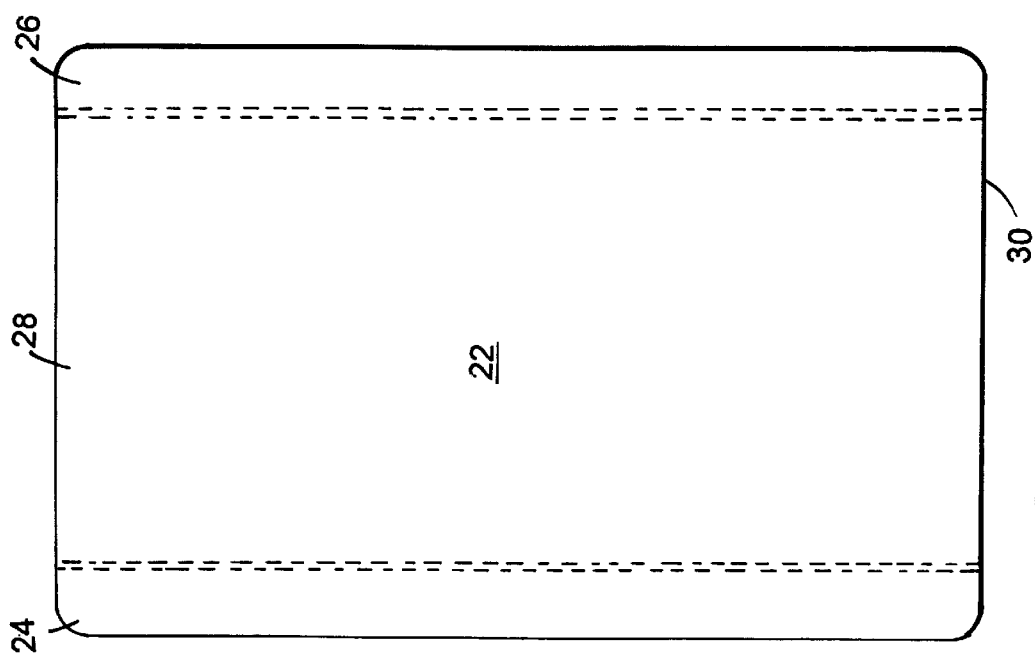

TIRE INFLATION BAG

BACKGROUND OF THE INVENTION

1. Field of the Invention

The invention relates to a safety device for use when inflating a pneumatic tire and a method of inflating such a tire using the safety device. The invention will find particular application in the tire servicing industry as well as in use by vehicle owners.

2. Background

It is not unknown for tires to explode when being inflated. Previously split ring commercial vehicle wheels with inner tubes were inflated after being clamped in a mechanical arrangement called an H-frame. The H-frame is a box frame construction especially designed for use when inflating split ring wagon wheels. Whilst the H-frame may contain the effects of an exploding tire by its presence adjacent the tire, the H-frame does not provide the desired degree of protection to fitters when inflating a tire. The fitters, when inflating the tire, could be positioned in one of many locations around the tire and H-frame.

As a tire bursts, there is a rapid release of highly compressed air and ejection of tire debris. This exposes the fitter who is inflating the tire to personal injury. This is undesirable. Tubeless tires are commonly used in modern tires. The H-frame is not used when inflating modern tires.

It is an object of the present invention to suggest a solution to the problem of risk of personal injury to tire fitters whilst inflating a tire for all kinds of pneumatic tires. For example, the invention is applicable to 40 ton wagon wheels having double or super single tires. The invention can also be used with heavy plant vehicle tires, as well as cars and even bicycle tires.

SUMMARY OF THE INVENTION

Accordingly, the invention comprises a method of inflating a pneumatic tire comprising: putting a bag over the tire so that it substantially envelops the exposed outer surface of the tire; and, inflating the tire, whereby the bag is capable of containing the debris of the explosion, whilst allowing the compressed air from the tire to escape, were the tire to explode.

In a further aspect of the invention there is provided a bag fitted over a tire so that the bag substantially envelops the exposed outer surface of the tire, whereby the bag is capable of containing the debris of explosion whilst allowing the compressed air from the tire to escape, were the tire to explode.

In preferred embodiments of both aspects of the invention, the bag is provided with an opening through which a tire can be inserted for inflation and retracted when inflated. Preferably, the bag is sized and shaped to correspond to the size and shape of the tire. The bag may be a close fit to the tire.

Preferably, the opening comprises a restraining means for resisting deformation or expansion of the opening. Preferably, the opening is elasticated. The opening may be provided with an elasticated rim which may be a hem through which an elasticated cord runs. The ends of the elasticated cord may be held together by a retaining member crimped onto the ends of the cord. Continuity of the cord is realized, in the preferred embodiment, by placing the two ends of the cord into the corresponding ends of a bore of a tube, such as a stainless steel or other metal pipe, which is then crimped so as to grip the ends of the cord.

Preferably, the cord is elastic. It need not be. For example, a non-elastic drawstring could be used.

Alternatively, or in addition, the opening may be provided with one or more straps across the opening.

In a preferred embodiment, the bag is substantially cylindrical. The bag may comprise a front and/or a rear wall.

In a preferred embodiment of the invention, the bag comprises front and rear walls which extend over substantially the entire side walls of the tire.

Preferably, the bag comprises the opening in a rear wall through which a tire can be inserted and retracted and a further opening in the front wall for insertion of an inflating device for inflating the tire. Preferably, when the first and further openings are provided, these are substantially opposite one another and/or of substantially the same size and/or shape. The first opening through which the tire is inserted preferably comprises a substantially circular hole in the rear wall. Preferably, the first and/or the further opening is centrally located within its respective wall. The further opening allows easy access to the valve of the tire.

Preferably, the bag is constructed from a front wall section having a continuous perimeter edge which is fastened to an edge of a side wall section. Typically the edge of the side wall is one edge of a rectangle and maybe slightly greater in length than the perimeter edge of the front wall section. The perimeter edge and the side wall edge are fastened together to form the bag. Preferably, the edges are sewn together.

Preferably, the bag can be formed from a length of material, hemmed on two opposed sides, the free ends of the material joined together, the free edge on one side being drawn in by an elasticated draw string, and the free edge on the other side being drawn in by a fixed length of draw string.

A particularly strong and therefore preferred form of seam between the two edges is a double folded hemmed or french seam.

The bag may comprise natural and/or man made material such as cloth and in particular woven cloth. Preferably the cloth is laminated. For example, the material from which the bag is constructed may be provided with a plastic coating such as polyurethane. In a preferred embodiment, the material used is a plain woven texturized nylon known as CORDURA (Trade Mark) with at least one coat of polyurethane. The material is preferably 1100d/tex.

The material of the bag is preferably of a strong heavy duty material designed to contain or diffuse an explosion of compressed air up to around 100–150 psi. The sewing thread used in the preferred embodiment is number 36 cotton thread.

The present invention will now be described by way of example only with reference to the accompanying drawings.

BRIEF DESCRIPTION OF THE DRAWINGS

In FIGS. 5 and 6, a separate circular rear wall is sewn onto the cylindrical side walls, by a double folded hemmed seam unlike the bag illustrated in FIGS. 2 and 4.

FIGS. 7, 8 and 9 show respectively a material sheet, and front and rear perspective views of a further form of bag according to the present invention, formed from the material sheet.

DETAILED DESCRIPTION OF THE PREFERRED EMBODIMENTS

Figure 1:
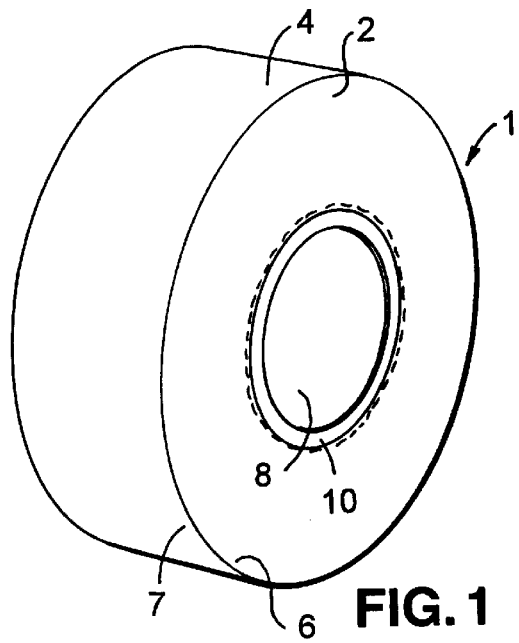
FIG. 1 is a perspective view of the front end of the bag according to the invention. In this embodiment, a hole is provided for inflating the tire.

FIG. 1 shows a bag (1) for a tire with a circular front wall (2) fastened to a cylindrical side wall (4). The circumferential edge (6) of the front wall (2) is, in this embodiment, sewn onto the edge of the cylindrical side wall by means of a double folded hemmed seam. Typically, a felling machine is used to produce this seam.

The front wall (2) has a concentric circular opening (8) with a hemmed edge (10). Circular opening (8) is typically around 18 inches (450 mm) in diameter suitable for, for example, a tire for a 40 ton truck. A 2×64 inches (50×1600 mm) hemming strip (not shown), hemmed on both sides, is wrapped over the edges of the opening (8) using a flat bed machine.

Figure 2:
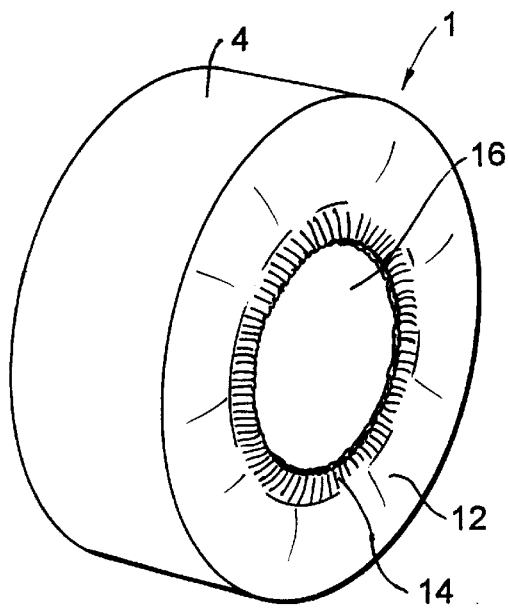
FIG. 2 is a perspective view of the rear of the bag of the invention showing an elasticated opening through which the tire can be inserted and retracted.
Figure 3:
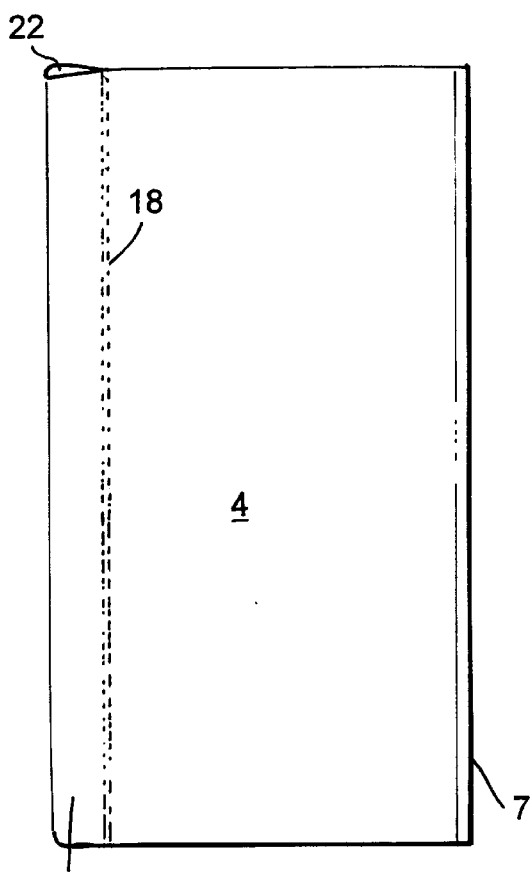
FIG. 3 is a plan view of the cylindrical side wall of the bag prior to assembly.

As shown in FIG. 2, the bag also has a rear wall (12) in which a circular opening (16) is provided by an elasticated rim (14). The construction of the elasticated rim can be seen more clearly with reference to FIG. 3. Elastication of rim (14) causes the side wall to gather up and form the rear wall (12). The bag is fitted over a tire by expansion of the elasticated opening (14) prior to inflation. Once the tire is inflated the bag is removed in the same way.

Side wall (4) is sewn from a 24×164 inches (600×4100 mm) strip which is given a 2 inch (50 mm) wide hem (20) along one edge. A 4 inch (100 mm) long section of the hem (20) (not shown) is left unsewn to allow, in this case, a 2 meter length of 10 millimeter diameter elastic rope to be pushed through the hem at a later stage. Again, hem (20) is sewn on a flat bed machine.

Figure 4:
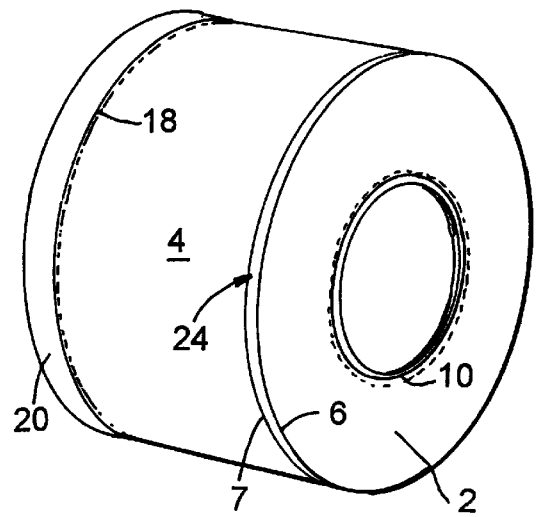
FIG. 4 shows a perspective view of the front end of bag according to the invention, before the elastic cord is inserted.
Figure 5:
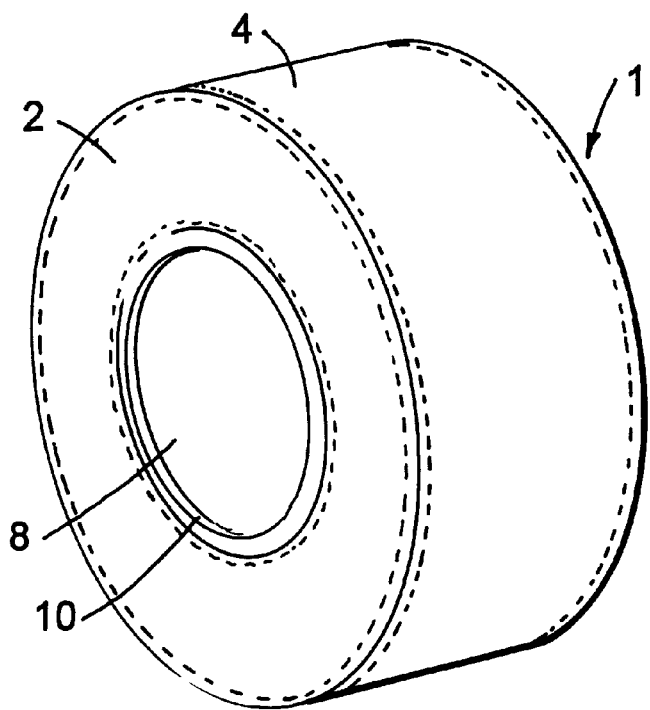
FIGS. 5 and 6 show perspective front and rear views respectively of the bag according to the invention illustrating the positioning of some of the lines of stitching.
Figure 6:
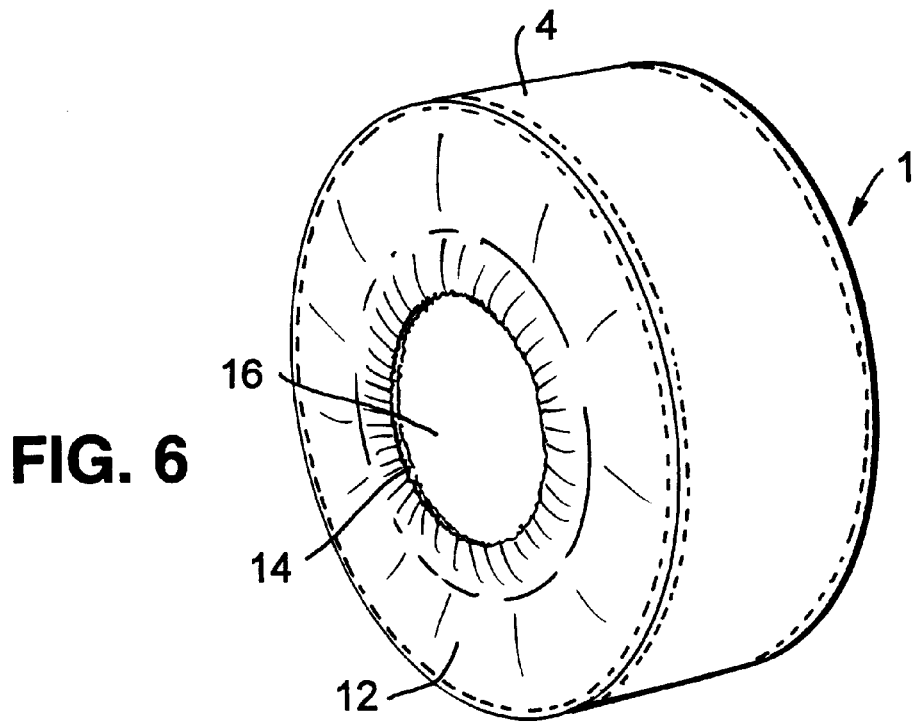

As shown in FIGS. 4, 5 and 6, side wall (4) is sewn onto the front wall (2) using a double folded hemmed seam or french seam (24). This is done on a felling machine. Basically, the double folded hemmed seam is constructed as follows: two sections of material, for the front wall and side wall, are laid on top of one another, the edge of one protruding slightly beyond the edge of the other. A line of stitches is put in place substantially parallel to the edges. The wider flap is then folded over the narrower flap and the two sections of material are opened out. The two flaps are folded over and sewn to one piece of the material by a line of stitching which is substantially parallel to the initial line of stitching. Typically, the wider flap is outermost. Once the side wall (4) has been sewn onto the front wall (2), the two shorter edges of the side wall (4) are sewn together, again using the same double folded hemmed seam (not shown).

Elastic rope or cord (22) is then pushed through the 2 inch (50 mm) hem using the 4 inch (100 mm) unsewn section. The elastic rope is joined together with a piece of 50 millimeter long stainless steel tube that has a 10 millimeter bore. The pipe is crimped onto the end of the elastic rope or cord, thus holding the two ends together.

Using the pipe to crimp the ends of the elastic rope together is particularly satisfactory since it is relatively quick and easy way of joining the two-ends of the elasticated rope together. other ways of doing this can, of course, be envisaged such as sewing and tying etc. Whilst it is preferred that an elastic rope is used to form an elasticated hem (14), a drawstring arrangement may be used instead. Once the tire is inserted into the bag the drawstring, which could be a rope or cord, for example, is pulled tight gathering up the side wall piece (4) to form the rear wall (12).

Next, the section of the hem in the side wall which had been left unsewn is now sewn up using a flat bed machine.

Whilst an elasticated rim has been suggested, straps retaining the bag in position in the event of an explosion may be used either as an alternative or in addition.

It will be apparent to those skilled in the art that the chosen length and type of cord will depend upon a number of factors. For example, the elasticated rim (14) must be sufficiently elastic to allow insertion of the tire before inflation and retraction of the tire following inflation. Nevertheless, the rim should not be so elastic that should the-tire explode during inflation, the elasticated rim is deformed to such an extent the explosive force is not directed substantially towards the centre of the bag, and thus away from a fitter. Similarly where a further opening for inflation (8) is provided this should be sufficiently strong, for example by virtue of hem (10), to resist expansion during an explosion.

Referring to FIGS. 7, 8 and 9 there is shown a bag (10) formed from a length of suitable material (22), as described above, the lengths of material being provided two hems (24) and (26) sewn at each edge. The free ends (28), (30) of the material are sewn together to form a tube (32). A length of elastic shock cord (34) is installed in the hem (24) to gather the hem in, and a length of rope (36) or similar material is installed in the hem (26).

In this embodiment as compared with the embodiments of the invention already described, the number of seams to make the bag is reduced to one, thereby easing manufacture, and reducing the risk of seam failure.

It will also be apparent to those skilled in the art that by the provision of a bag which substantially envelopes the tire during inflation, the release of compressed air and flying debris which can cause injury or damage to the fitter is directed inwards. In other words, the compressed air is vented safely and flying debris is more likely to be contained. The degree of closeness of the woven material can, of course, be varied. For example, whilst a closely woven nylon or natural cloth is preferred, less closely woven cloth or other material may be used. The preferred material is a plastic coated nature material called CORDURA of 1100 d/tex with one internal coat of polyurethane. Other laminated materials could be used. Other alternatives include the use of chain mail. This may be particularly applicable when tires for heavy plant vehicles are intended to be inflated inside the bag.

We claim:

1. A method of inflating a tire comprising:
   placing a bag over the tire so that it substantially envelops the exposed outer surface of the tire;
   inflating the tire; and
   protecting a tire fitter during tire inflation by containing within the bag any tire debris formed by a potential explosion of the tire during inflation.

2. A method according to claim 1 in which the bag is constructed from one or more sections sewn together to form the bag.

3. A method according to claim 1 in which the bag is constructed from a length of cloth, the free ends of which are joined together to form a roll, the open ends of the roll being drawn in by drawstrings.

4. A method according to claim 3 in which the drawstrings are elasticated.

5. A method according to claim 3 in which the drawstrings are of fixed length.

6. A method according to claim 1, in which the bag comprises at least one of natural and manmade cloth.

7. A method according to claim 6, in which the cloth is laminated.

8. A method according to claim 7, in which the cloth is provided with a plastic coating.

9. A method according to claim 1, in which the bag is substantially cylindrical.

10. A method according to claim 9, in which the bag comprises a substantially circular front wall and rear wall.

11. A method according to claim 1 including the step of forming an opening through which a tire can be inserted for inflation and retracted when inflated.

12. A method according to claim 1, including the step of shaping the bag to correspond to the shape of the tire.

13. A method according to claim 12, in which the bag is of a comparable size to the tire.

14. A method according to claim 11, including the step of resisting expansion of the opening.

15. A method or bag according to claim 14, in which the opening is elasticated.

16. A method according to claim 14 in which the opening is formed with one or more straps extending from one side of the opening to the other.

17. A method according to claim 11 in which the opening is formed in a rear wall of the bag and including the steps of:
providing a further opening in a front wall of the bag; and
inserting an inflating device through the further opening.

18. A method according to claim 17, in which the opening and further opening are substantially opposite one another.

19. A method according to claim 17, in which the opening and further opening are of substantially the same size.

20. A method according to claim 17, in which at least one of the opening and further opening comprises a substantially circular hole in a respective wall of the bag.

21. A method according to claim 17, in which at least one of the opening and the further opening is concentrically located in its respective wall of the bag.

22. A method according to claim 11, in which the opening comprises an elasticated rim.

23. A method according to claim 22, in which the opening further comprises an elastic cord joined by crimping each and into a retaining device.

24. A method according to claim 22 in which the opening further comprises a drawable cord joined together by crimping each end into a retaining device.

25. A method according to claim 23, in which the retaining device is a tube.

26. A method according to claim 11 in which the opening comprises a drawable rim.

* * * * *